United States Patent

[11] 3,597,541

[72] Inventors John G. Proakis
Waltham;
Dennis J. Gooding, Acton, Mass.; James H. Miller, Kenmore, N.Y.
[21] Appl. No. 887,653
[22] Filed Dec. 23, 1969
[45] Patented Aug. 3, 1971
[73] Assignee Sylvania Electric Products Inc.

[54] DECISION-DIRECTED ADAPTED EQUALIZER CIRCUIT
4 Claims, 2 Drawing Figs.

[52] U.S. Cl. .......... 178/88, 178/70 R, 179/170.2
[51] Int. Cl. .......... H04l 17/16, H04l 25/52
[50] Field of Search .......... 178/70 R, 88; 179/170.2

[56] References Cited
UNITED STATES PATENTS

| | | | |
|---|---|---|---|
| 3,465,106 | 9/1969 | Nagata et al. .......... | 179/170.2 |
| 3,500,000 | 3/1970 | Kelly et al. .......... | 179/170.2 |

*Primary Examiner*—Kathleen H. Claffy
*Assistant Examiner*—William A. Helvestine
*Attorneys*—Norman J. O'Malley, Elmer J. Nealon and Robert T. Orner

ABSTRACT: A decision-directed adaptive equalizer circuit employs first and second tapped delay line filters including circuitry to adjust the gain at each tap to a predetermined value. The first tapped delay line filter contains a received signal having intersymbol interference, and the second tapped delay line filter contains decision signals on previously received symbols. A summation circuit combines the output signals from the first and second tapped delay lines to form an estimate signal of the symbol stored in the last section of the first tapped delay line filter. A quantizer circuit quantizes the estimate signal and directs it to a feedback circuit which compares the quantized an unquantized estimate signals to generate an error signal. The error signal is employed to adjust the gain at each tap of the first and second delay line filters.

INVENTORS
JOHN G. PROAKIS
DENNIS J. GOODING
JAMES H. MILLER
BY Robert T. Orner
ATTORNEYS INVENTORS
JOHN G. PROAKIS
DENNIS J. GOODING
JAMES H. MILLER
BY Robert T. Ames
ATTORNEYS

DECISION-DIRECTED ADAPTED EQUALIZER CIRCUIT

BACKGROUND OF THE INVENTION

This invention relates to equalizing networks and in particular to adaptive equalizer circuits useful, for example, in digital data transmission systems where high data transmission rates are employed over bandwidth-limited communication channels such as telephone lines.

When telephone channels are used for digital data transmission, one factor that limits the data rate is the distortion caused by nonconstant amplitude frequency characteristics and/or by nonlinear phase frequency characteristics. This distortion usually affects pulse transmission by causing intersymbol interference, i.e., pulses are stretched in time causing an overlap which gives rise to intersymbol interference. The intersymbol interference is the primary factor limiting the rate of digital data transmission.

A high data transmission rate is possible over a time-dispersive channel when a tapped delay line filter with adjustable tap gains is used at the receiving terminal of the communication system. A number of prior art systems are referred to in an article written by the applicants and published in the IEEE Transactions on Information Theory, July 1969, pp. 484 through 497. In most of the existing systems, the tap gains of the filter are adjusted automatically. Such a tapped delay line filter is called an adaptive or an automatic equalizer. The time delay between taps of the tapped delay line filter is T seconds where 1/T is the rate at which pulses are transmitted through the channel.

The received signal, usually after it has been translated in frequency to baseband, is fed into the tapped delay line filter for processing. The operations performed on the signal in the tapped delay line filter are as follows:

The signal at each tap of the filter is multiplied by a gain corresponding to that tap, and the sum of products from all the taps is formed to give the output of the filter. This output is sampled once every T seconds to yield an estimate of the desired information symbol in each signaling interval of time duration T. Since the transmitted information sequence is digital (discrete), the estimate in each signaling interval is quantized to the nearest symbol in the alphabet of possible transmitted symbols. This procedure results in a received information sequence which, in the absence of errors, is identical to the transmitted information sequence.

Errors in the received information sequence are caused by additive noise and intersymbol interference caused by the channel. The number of errors can be minimized but not totally eliminated by proper adjustment of the tap gains of the tapped delay line filter. The few automatic equalizers known presently use various ways for adjusting these tap gains. In general, a compensating signal, usually generated by observing the output of the tapped delay line filter, is fed back for the purpose of either increasing or decreasing the value of each tap gain. The compensating signal is generated in a way which results in either reducing the effect of intersymbol interference or in reducing both the effect of intersymbol interference and additive noise. The degree of effectiveness of an automatic equalizer depends on the amount by which the intersymbol interference and additive noise are reduced. The effectiveness, in turn, depends on the type of signal processing performed by the equalizer.

The basic limitation of the automatic equalizers presently known lies in their inability to cope with a large amount of intersymbol interference that frequently arises in data transmission. This limitation is a result either of confining the signal processing functions of the tapped delay line filter to be linear and/or in the method by which the tap gains are adjusted.

It is the object of this invention to eliminate a large amount of intersymbol interference and additive noise in the data signal by employing a nonlinear signal processing tapped delay line system.

SUMMARY OF THE INVENTION

Briefly, a decision-directed adaptive equalizer device according to the present invention includes first and second data storage means, for example, tapped delay line filters, each including a number of series-connected delay elements. A first plurality of multiplier means has a single multiplier means associated with each delay element in the first data storage means and similarly a second plurality of multiplier means has a single multiplier means associated with each delay element in the second data storage means. Each multiplier means multiplies the data stored in its associated delay element by a predetermined value. A first summation means having an input connection from each multiplier means of first and second plurality of multiplier means generates an estimate of the signal stored in the last delay element of the first data storage means by taking the sum of the products from each multiplier means.

A quantizer circuit connected to the summation circuit quantizes the estimate signal into a predetermined number of levels, for example, two levels (+1, −1), and directs the quantized signal to the second data storage means and to the input connection from the first summation means and generates an error signal by comparing the quantized estimate with the unquantized estimate. This error signal is directed to each multiplier means of the first and second plurality of multiplier means to control the gain of the multiplier means and thereby adjust the predetermined value by which the data in the associated storage element is multiplied.

In the second storage means, the contents of each delay element (the contents being the estimates of the previously received signals) are multiplied by a gain factor corresponding to that paritucular delay element and the sum of the products from the total number of delay elements is added to the sum obtained from the first storage means to yield an estimate of the information symbol being detected. The gains of each of the multiplier means of both first and second storage means are adjusted automatically by the error signal which is generated so as to minimize the total means square error due to the combination of intersymbol interference and additive noise. By employing the previous estimates stored in the second storage means, the decision-directed adaptive equalizer of the present invention is not confined to a linear operation and thus larger amounts of symbol interference can be tolerated at the input to the decision-directed adaptive equalizer than heretofore possible.

BRIEF DESCRIPTION OF THE DRAWINGS

The invention will be more fully understood from the following detailed description taken in conjunction with the accompanying drawings in which.

DETAILED DESCRIPTION OF THE INVENTION

Figure 1:
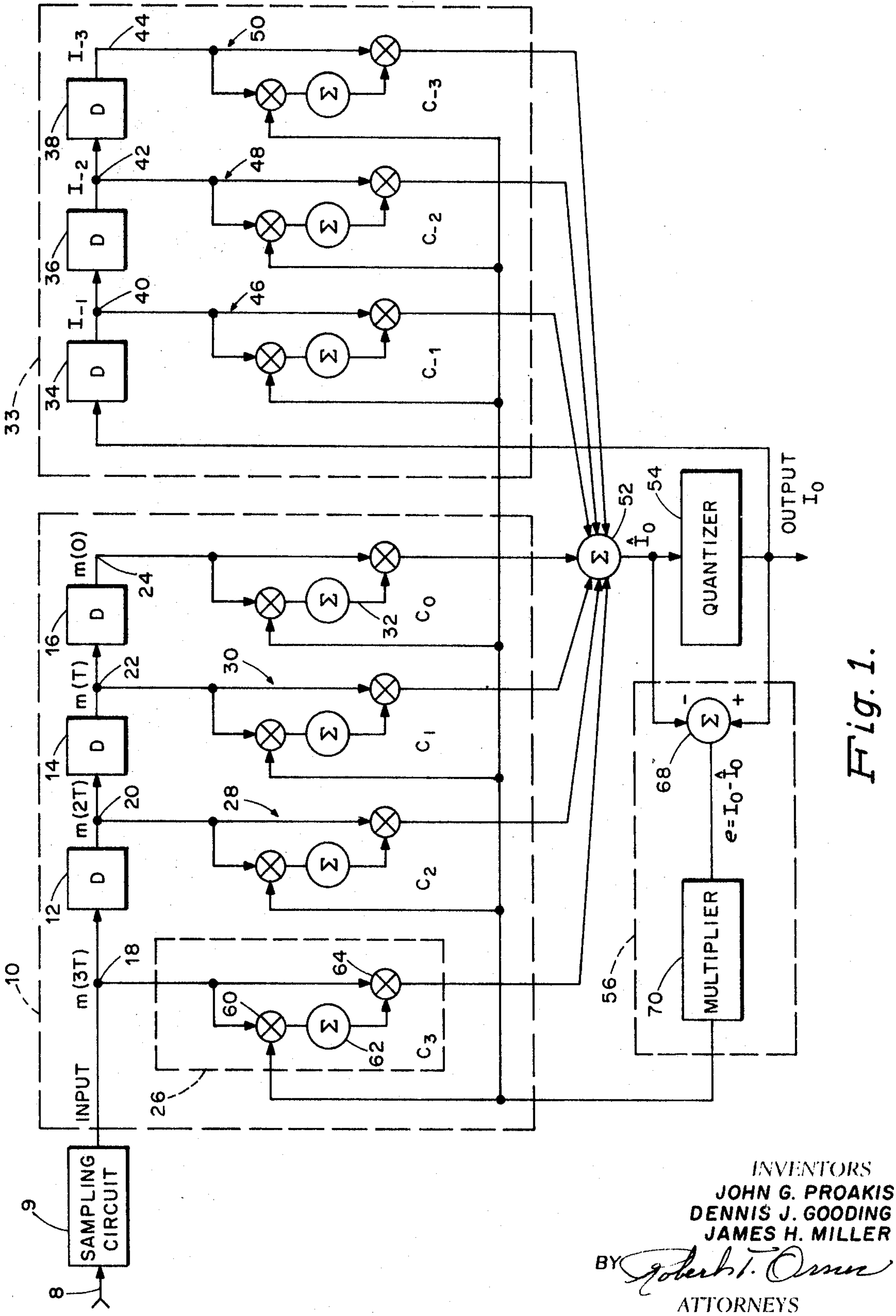
FIG. 1 is a block diagram of one embodiment of a decision-directed adaptive equalizer device according to the present invention.

A decision-directed adaptive equalizer device according to the present invention is shown in FIG. 1 and includes an input terminal 8 connected to any well-known digital sampling circuit 9. Connected to the sampling circuit 9 is a first delay storage means such as a first tapped delay line filter 10. The first tapped delay line filter 10 includes a first plurality, for example three, of series connected delay elements 12, 14 and 16 and a first plurality, for example four, of taps 18, 20, 22 and 24. (The number of delay elements employed is a function of the data rate and the characteristics of the particular transmission line employed.) Associated with each of the taps 18, 20, 22 and 24 is a multiplier means 26, 28, 30 and 32, respectively, to be discussed in detail hereinafter. Similarly, a second tapped delay line filter 33 includes a number, for example three, of series connected delay elements 34, 36 and 38, three taps 40, 42 and 44 connected to the output of the respective delay elements 34, 36 and 38 and three multiplier means 46, 48 and 50 connected to the respective taps 40, 42 and 44.

A first summation means 52, such as a resistor-summing network, has input connections from each multiplier means of the first and second tapped delay line filters 10 and 33 and an output connection to a quantizer unit 54. The output connection of the quantizer unit 54 is connected to first delay element 34 of the second tapped delay line filter and to a feedback circuit 56 which has a second input connection from the first summation means 52. The output connection of the feedback circuit 56 is connected to each of the multiplier means of the first and second tapped delay line filters 10 and 33.

Briefly, a received signal which includes an intelligence symbol, additive noise and intersymbol interference signal is received, sampled by the sampling circuit 9 and propagated down the first tapped delay line 10. The delay between adjacent taps is T seconds where 1/T is the pulse transmission rate and each tap has a gain associated with it by virtue of its associated multiplier means. The signal at each tap in the first tapped delay line filter 10 is multiplied by a tap gain C (to be discussed in detail hereinafter) corresponding to that tap. The first summation means 52 takes the sum of the products from multiplier means 26, 28, 30 and 32 to generate an estimate of the symbol in the last tap 24 of the first tapped delay line filter 10.

Previous estimates of received symbols are stored in the delay elements 34, 36 and 38 of the second tapped delay line filter 33, and each previous estimate is multiplied by its respective tap gain $C_11$, $C_{12}$ and $C_{13}$. The products of the previous estimate signals and the respective gains are directed to the first summation means 52 where they are summed with the output signals of the first tapped delay line filter 10 to make an estimate $\hat{I}_0$ of the symbol at the last tap 24 of the first tapped delay line filter. By using the previous estimates in the decision-directed adaptive equalizer to form the symbol estimate, large amounts of intersymbol interference can be tolerated. Thus, the adaptive equalizer of the present invention is not limited to a linear operation.

The estimate signal $\hat{I}_0$ is directed through the quantizer unit 54 to produce a quantized signal $I_0$. The estimate signal $\hat{I}_0$ is then subtracted from the quantized signal $I_o$ to form an error signal $e$ $$e=I_0-\hat{I}_0 \qquad (1)$$

The error signal is then multiplied by a predetermined value Δ ( to be discussed in detail hereinafter) and directed to each multiplier circuit in both tapped delay line filters 10 and 33 to adjust the gain of the respective taps.

Figure 2:
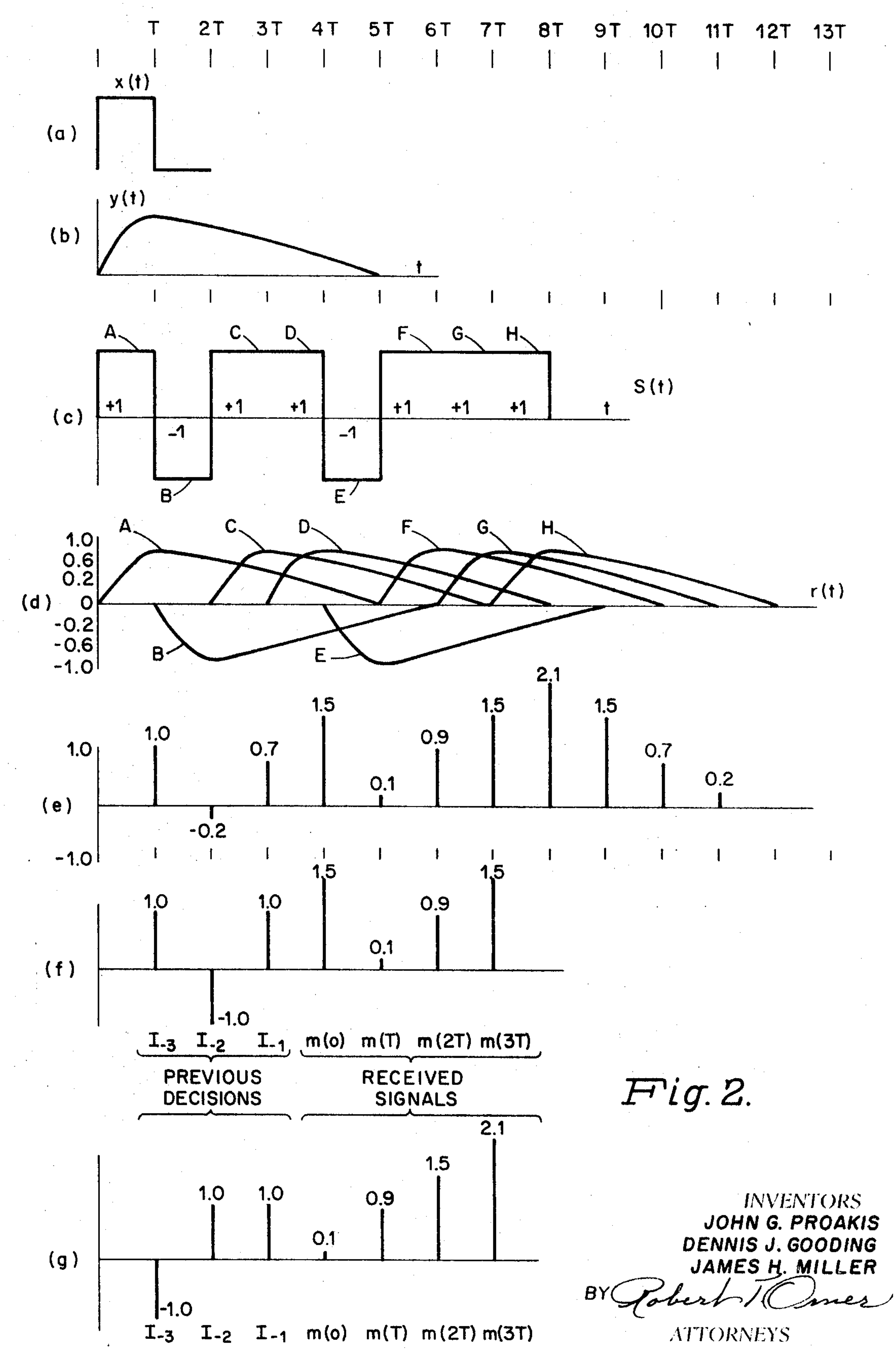
FIGS. 2*a—g* shows a series of waveforms useful in explaining the operation of the embodiment of FIG. 1.

The waveforms of FIG. 2 are useful in explaining in detail the operation of the embodiment of FIG. 1. Assume a pulse $x(t)$, as shown in waveform ($a$) of FIG. 2, is transmitted down a transmission line and assume that the impulse response is such that the output signal at the input end of the transmission line is similar to that depicted in waveform ($b$) of FIG. 2. Assume further that information symbols A through H (which may be complex valued in general) modulate a basic waveform $s(t)$ at a rate 1/T to form the composite signal depicted in waveform ($c$) of FIG. 2 and that $s(t)$ is directed along the transmission line described above. The resultant signal $r(t)$ at the output end of the transmission line or terminal 8 is shown as waveform ($d$) of FIG. 2. The sampling circuits 9 thus samples the signal $r(t)$ every T seconds to generate a composite signal of the received energy present at the input 8 of sampling circuit 9 at the time the sample is taken. The resultant composite sampled signal for the transmitted symbols A—H is depicted in waveform ($e$) of FIG. 2.

For example, assume the sampling circuit 9 takes a sample of the signal $r(t)$, waveform ($d$) of FIG. 2, at the time 4T, the composite signal at that time is the algebraic sum of received energy from symbols A, B, C and D. In the above example, the maximum energy contributions from any one symbol is normalized to 1.0 volt. Symbol A at time 4T contributes +0.2 volts, symbol B contributes −0.5 volts, symbol C contributes +0.8 volts and symbol D contributes +1.0 volt. The algebraic sum of the energy from these four symbols at the sampling time 4T is then +1.5 volts as indicated in waveform ($e$) of FIG. 2.

For the transmission line having the characteristics shown in waveform ($b$) of FIG. 2, the approximate tap gains of the first and second tapped delay line filters 10 and 33 are as follows: $C_{13}$=0.20, $C_{12}$=−0.50, $C_{11}$=−0.80, $C_0$=1.00, $C_1$=0.05, $C_2$=−0.02 and $C_3$=0.01. Assume, as shown in waveform ($f$) of FIG. 2, that the sampled energy at time 4T is in the last tap 24 of the first tapped delay line filter 10 and estimate $\hat{I}_0$ of the symbol D is to be made. Note that the previous quantized estimate (+1, −1, +1, respectively) of the symbols A, B and C are stored in respective delay elements 40, 42 and 44. The estimate $\hat{I}_0$ of the symbol D is the sum of the products of the tap gain times the signal stored in the associated delay element and is indicated in table I.

TABLE I

| $C_k$ M($k$T) | | Output signal (Volts) | |
|---|---|---|---|
| ($C_3$) [$m$(7T)] | = | (0.01) (1.5) | = 0.015 |
| ($C_2$) [$m$(6T)] | = | (−0.02) (0.9) | = −0.018 |
| ($C_1$) [$m$(5T)] | = | (+0.05) (0.1) | = +0.005 |
| ($C_0$) [$m$(4T)] | = | (1.00) (1.5) | = −1.500 |
| ($C_{11}$) [$m$(3T)] | = | (−0.80) (1.0) | = −0.800 |
| ($C_{12}$-) [$m$(2T)] | = | (−0.50) (−1.0) | = 0.500 |
| ($C_{13}$) [$m$(T)] | = | ( −0.20) (1.0) | = −0.200 |
| | | | Σ=+1.002 |

The estimate signal $\hat{I}_0$ for the symbol D is therefore +1.002. Since the estimate is greater than zero, the quantized estimate $I_o$ is a +1.

At the next time interval, as shown in waveform ($g$) of FIG. 2, the data in the first and second tapped delay line filters 10 and 33 is shifted to the right such that an estimate $\hat{I}_0$ of the data occurring at time interval 5T is to be made. The data corresponds to symbol E and is a −1 bit. (Note, however, that the energy stored in tap 24 of the first tapped delay line filter is a +0.1 volt.) The data samples and previous estimate signals are multiplied by their respective tap gains with the following products appearing at the input to the first summation means 52.

| Multiplier No. | Products |
|---|---|
| 26 | +0.021 |
| 28 | −0.030 |
| 30 | +0.045 |
| 32 | +0.100 — |
| 46 | −0.800 |
| 48 | −0.500 |
| 50 | +0.200 |
| | Σ=−0.966 |

Since this number, −0.966, is less than zero, the quantizer output estimate is the correct symbol −1.0 corresponding to the negative pulse E.

DETERMINATION OF THE TAP GAINS

A detailed explanation of the technique for obtaining the appropriate tap gains $C_k$ and the correct feedback factor Δ is given in the article by the inventors appearing in the IEEE Transactions on Information Theory, July 1969, on page 484. A few of the fundamental expressions will be stated here for explanation purposes.

The tap gains of the tapped delay line filters 10 and 33 will be designated as $C_k$ where $k$=−$K$,..., −1, 0, 1, $K$. The estimate $\hat{I}_0$ of the desired symbol is $$\hat{I}_0=\sum_{k=-K}^{k} C_k m(kT) \qquad (2)$$

where $m(kT)$ is the signal-plus-noise at the $k$th tap.

The estimate $\hat{I}_0$ is quantized to the nearest symbol in the alphabet of transmitted symbols. A symbol error occurs if the quantized value of $\hat{I}_0$ is not $I_0$. It is desired that the tap gains be chosen such that the mean square error between the desired symbol $I_0$ and the estimate $I_0$ is minimized. The means square error is $$\epsilon = E|I_0 - \hat{I}_0|^2 \quad (3)$$

where $\epsilon$ denotes the operation of taking the average value. Substituting equation (2) into equation (3) yields $$\epsilon = E\left|I_0 - \sum_{k=-K}^{K} C_k m(kT)\right|^2 \quad (4)$$

To minimize the means square error, the tap gains are adjusted recursively according to the relation $$C_k^{(v+1)} = C_k^{(v)} + \Delta[e^{(v)} m(kT)] \quad (5)$$

where $k=-K, \ldots, -1, 0, 1, \ldots, K$; $e^{(v)} m^*(kT)$ is the product between the error $e^{(v)}$ at the $v^{th}$ iteration and the complex conjugate of the data sample $m(kT)$ in the $k^{th}$ tap at the $v^{th}$ iteration and $\Delta$ is the feedback factor. Each iteration correspond to the entrance of a new sample into the tapped delay line filter 10. Therefore, the recursive relation indicated equation (5) is performed once every T seconds. The feedback factor $\Delta$ must satisfy the inequality $0<\Delta<2/\lambda_{max}$ where $\lambda_{max}$ is the largest eigenvalue of a covariance matrix $\vec{A}$. $\vec{A}$ is the $(2K+1)\times(2K+1)$ covariance matrix of input samples $m(kT)$.

Equation (5) is solved at each tap by its respective multiplier means in combination with the feedback circuit 56. The operation and construction of all the multiplier means are similar; therefore, only multiplier means 26 will be discussed in detail. Multiplier means 26 includes a first multiplier circuit 60 having input connections from the feedback circuit 56 and the first tap 18 of the first tapped delay line filter 10 and an output connection to a second summation circuit 62 such as an accumulator register. A second multiplier circuit 64 has input connections from the first tap 18 of the first tap 18 of the first tapped delay line filter 10 and the second summation circuit 62 and an output connection to the first summation circuit 52.

The feedback circuit 56 includes a third summation circuit 68, such as a well-known binary adder, having input connections from the first summation circuit 52 and the quantizer circuit 54 and an output connection to a third multiplier circuit 70 such as a voltage divider in an analog implementation or a shift register in the digital implementation. The shift register is shifted an integer number of places to the right to reduce the error signal $e$ by the appropriate feedback factor $\Delta$.

The combination of the feedback circuit 56 and the multiplier means 26 solve the recursive algorithm of equation (5) in the following manner. The output signal of the third summation circuit is the term $e^{(v)}$ of equation (5) and is multiplied by the feedback factor $\Delta$ in the third multiplier circuit 70 such that the output signal of the feedback circuit 56 is the signal represented by the term $\Delta e^{(v)}$ of equation (5). The signal $\Delta e^{(v)}$ is multiplied by the signal $m^*(kT)$ at the first multiplier circuit 26 to produce the signal represented by the term $\Delta[e^{(v)} m^*(kT)]$ of equation (5). The second summation circuit which stores the previous tap gain $C_k^{(v)}$ adds the output signal $\Delta[e^v m^*(k)]$ to the signal $C_k^{(v)}$ to yield the desired tap gain output signal $C_k^{(v+1)}$ and the solution to equation (5). The second multiplier circuit 64 then multiplies the signal $m^*(kT)$ by the tap gain signal $C_k^{(v+1)}$ and the product is directed to the first summation means 54 where it is added to the product signals from the other taps of the first and second tapped delay line filters 10 and 33 to form the estimate signal $\hat{I}_0$.

The method described above for adjusting the tap gains automatically is based on the principle that when the tap gains have reached their correct values the feedback signal $\Delta e^{(v)}$ is uncorrelated with the complex conjugate of the signal-plus-noise sample and the quantized estimate signals in the first and second tapped delay line filters 10 and 33 respectively. Thus, by cross correlating or multiplying the tap contents $m^*(kT)$ by their correct value. By storing previous decisions or estimate signals in the second tapped delay line filter 33 and using these signals to form new estimates, the intersymbol interference arising from symbols that have already been detected is substantially eliminated.

The signal-plus-noise samples entering filter section 10 and the decisions in filter section 33 may be complex valued in general. This allows processing of both in-phase and quadrature signal components simultaneously thus making the decision-directed adaptive equalizer suitable for use in either pulse amplitude modulation signaling or multiphase phase shift keying signaling.

While there has been shown and described what is considered a preferred embodiment of the present invention, it will be obvious to those skilled in the art that various modifications and changes may be made therein without departing from the invention as defined by the appended claims.

What we claim is:

1. A circuit for reducing the effects of intersymbol interference and additive noise in the transmission of digital data comprising:

first data storage means having a number of series connected delay elements, each delay element being operable to store a particular symbol of a data sequence;

a first plurality of multiplier means, each multiplier means having an input connection to a separate delay element of said first data storage means and being operable to multiply the particular symbol of the first data sequence stored in its associated delay element by a predetermined value to form a resulting product signal;

second data storage means having a number of series connected delay elements and being operable to store the symbols of a second data sequence in the delay elements of said second storage means;

a second plurality of multiplier means, each having an input connection to a separate delay element of said second data storage means and being operable to multiply the symbols of the second data sequence stored in its associated delay element by a predetermined value to form a resulting product signal;

quantizer means having an input terminal and an output terminal, said output terminal being connected to said second data storage means;

first summation means connected between each multiplier means of said first and second plurality of multiplier means and the input terminal of said quantizer means and being operable to sum the product signals from each of said multiplier means to produce an estimate signal of the symbol of the first data sequence stored in a predetermined storage element of said first data storage means, said quantizer means being operative to quantize the estimate signal from said first summation means into a predetermined number of signal levels; and feedback means having input connections from said first summation means and said quantizer means and an output connection to each multiplier means of said first and second plurality of multiplier means, said feedback means being operable to compare the estimate signal from said first summation means with the quantized estimate signal and to produce an error signal which adjusts the gain of each multiplier means to thereby set the predetermined value of each of said multiplier means.

2. A circuit for reducing the effect of intersymbol interference and additive noise in the transmission of digital data comprising:

first delay line filter means having an input terminal, an output terminal, a plurality of series-connected delay elements of predetermined delay value connected between said input and output terminals and a plurality of taps, each tap being connected to a separate juncture of two of said delay elements, said first delay line filter being operative to store said digital data having intersymbol interference;

first plurality of multiplier means, each of said multiplier means being connected between a separate one of said plurality of taps of said first delay line filter and said first summation means and each of said multiplier means being operative to multiply a signal stored in its associated delay element by a predetermined value;

second delay line filter means having an input terminal, a plurality of series-connected delay elements of predetermined delay value and a plurality of taps, each of said taps being connected to a separate juncture of two of said delay elements of said second delay line filter;

second plurality of multiplier means, each being connected between a separate one of said plurality of taps of said second delay line filter means and said first summation means and each of said multiplier circuits being operative to multiply a signal stored in its associated delay element by a predetermined value;

said first summation means being operative to sum the output signals from each of the multiplier means of said first and second plurality of multiplier means to form an estimate of the signal stored in the last delay element of said first delay line filter means;

quantizer means having an input connection to said first summation means and an output connection to the input terminal of said second delay line filter connection, said quantizer means being operative to quantize the estimate signal from said first summation means; and feedback means having input connections from said first summation means and said quantizer means and an output connection to each of said multiplier means of said first and second plurality of multiplier means, said feedback means being operative to generate an error signal proportional to the difference between the estimate signal from said first summation means and the quantized signal from said quantizer means, each of said multiplier means being operative to adjust its gain in response to the error signal from said feedback means.

3. A circuit for reducing the effect of intersymbol interference and additive noise according to claim 2 wherein each of said multiplier means includes:

a first multiplier circuit having a first input connection from its associated tap and a second input connection from the output connection of said feedback means, said first multiplier circuit being operative to obtain the product of the signal stored in its associated delay element by the error signal from said feedback means;

a second summation means connected to said first multiplier circuit and being operative to add the product obtained from said first multiplier circuit to the product from the previous signal to thereby generate said predetermined value; and a second multiplier circuit having a first input connection from its associated tap and a second input connection from said second summation means and being operative to provide the resultant product signal to said first summation means.

4. A circuit for reducing the effect of intersymbol interference according to claim 3 wherein said feedback means includes:

third summation means having a first input connection from said first summation means and a second input connection from said quantizer means, and being operative to compare the estimate signal and the quantizer estimate signal to obtain a difference signal; and a third multiplier circuit having an input connection from said third summation means and an output connection to each of said multiplier means, said third multiplier circuit being operative to multiply the difference signal from said third summation means by a predetermined factor to thereby produce said error signal to adjust the predetermined value of gain of each of said multiplier means.